(12) United States Patent
Barhorst et al.

(10) Patent No.: US 12,134,147 B2
(45) Date of Patent: *Nov. 5, 2024

(54) SYSTEMS AND METHODS FOR LOW-MANGANESE WELDING ALLOYS

(71) Applicant: Hobart Brothers LLC, Troy, OH (US)

(72) Inventors: Steven Edward Barhorst, Sidney, OH (US); Kevin M. Krieger, Austintown, OH (US); Joseph C. Bundy, Piqua, OH (US); Mario Anthony Amata, Dublin, OH (US); Daryl L. Duncan, Troy, OH (US); Susan Renata Fiore, Dublin, OH (US)

(73) Assignee: HOBART BROTHERS LLC, Troy, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,711

(22) Filed: Feb. 14, 2023

(65) Prior Publication Data
US 2023/0294217 A1   Sep. 21, 2023

Related U.S. Application Data

(63) Continuation of application No. 16/821,614, filed on Mar. 17, 2020, now Pat. No. 11,577,345, which is a
(Continued)

(51) Int. Cl.
*B23K 35/30* (2006.01)
*B23K 9/18* (2006.01)
(Continued)

(52) U.S. Cl.
CPC ............ *B23K 35/3053* (2013.01); *B23K 9/18* (2013.01); *B23K 35/00* (2013.01);
(Continued)

(58) Field of Classification Search
CPC ................ B23K 35/40; B23K 35/0255; B23K 35/3066; B23K 35/3053
See application file for complete search history.

(56) References Cited

U.S. PATENT DOCUMENTS 2,798,824 A   7/1957   Pierre
2,870,047 A   1/1959   Kee
(Continued)

FOREIGN PATENT DOCUMENTS

CN   87103887    12/1988
CN   102139424    8/2011
(Continued)

OTHER PUBLICATIONS

Canadian Office Action Appln No. 2,955,351 dated Feb. 3, 2018 (4 pgs).
(Continued)

*Primary Examiner* — Thien S Tran
(74) *Attorney, Agent, or Firm* — McAndrews Held & Malloy, Ltd.

(57) ABSTRACT

Systems and methods for low-manganese welding alloys are disclosed. An example arc welding consumable may comprise: between 0.4 and 1.0 wt % manganese; strengthening agents selected from the group consisting of nickel, cobalt, copper, carbon, molybdenum, chromium, vanadium, silicon, and boron; and grain control agents selected from the group consisting of niobium, tantalum, titanium, zirconium, and boron. The grain control agents may comprise greater than 0.06 wt % and less than 0.6 wt % of the welding consumable. The resulting weld deposit may comprise a tensile strength greater than or equal to 70 ksi, a yield strength greater than or equal to 58 ksi, a ductility (as measured by percent elongation) of at least 22%, and a Charpy V-notch toughness greater than or equal to 20 ft-lbs at −20° F. The welding consumable may provide a manganese fume gen-
(Continued)

eration rate less than 0.01 grams per minute during the arc welding operation.

20 Claims, 6 Drawing Sheets

Related U.S. Application Data continuation of application No. 15/847,282, filed on Dec. 19, 2017, now Pat. No. 10,589,388, which is a continuation of application No. 14/457,599, filed on Aug. 12, 2014, now Pat. No. 9,844,838, which is a continuation-in-part of application No. 14/265,750, filed on Apr. 30, 2014, now Pat. No. 9,895,774.

(60) Provisional application No. 61/821,064, filed on May 8, 2013.

(51) Int. Cl.
*B23K 35/00* (2006.01)
*B23K 35/02* (2006.01)
*B23K 35/34* (2006.01)
*B23K 35/40* (2006.01)
*C22C 38/22* (2006.01)

(52) U.S. Cl.
CPC ...... *B23K 35/0244* (2013.01); *B23K 35/0255* (2013.01); *B23K 35/0261* (2013.01); *B23K 35/0266* (2013.01); *B23K 35/0294* (2013.01); *B23K 35/3066* (2013.01); *B23K 35/3073* (2013.01); *B23K 35/308* (2013.01); *B23K 35/3086* (2013.01); *B23K 35/3093* (2013.01); *B23K 35/34* (2013.01); *B23K 35/40* (2013.01); *B23K 35/406* (2013.01); *C22C 38/22* (2013.01); *Y10T 428/12972* (2015.01)

(56) References Cited

U.S. PATENT DOCUMENTS

| | | |
|---|---|---|
| 3,162,751 A | 12/1964 | Robbins |
| 3,195,230 A | 7/1965 | Peck |
| 3,362,811 A | 1/1968 | Heuschkel |
| 3,405,248 A | 10/1968 | Essers |
| 3,513,289 A | 5/1970 | Blake |
| 3,529,996 A | 9/1970 | David |
| 3,702,390 A | 11/1972 | Blake |
| 3,725,054 A | 4/1973 | Perfect |
| 3,745,294 A | 7/1973 | Arikawa |
| 3,767,891 A | 10/1973 | Haverstraw |
| 3,786,676 A | 1/1974 | Korolyshun |
| 3,800,120 A | 3/1974 | Helton |
| 3,843,867 A | 10/1974 | Helton |
| 3,848,109 A | 11/1974 | Zvanut |
| 3,868,491 A | 2/1975 | Ito |
| 3,935,421 A | 1/1976 | Ballass |
| 4,010,309 A | 3/1977 | Petersen |
| 4,045,593 A | 8/1977 | Hill |
| 4,110,514 A | 8/1978 | Nicholson |
| 4,122,238 A | 10/1978 | Frantzerbsr |
| 4,125,758 A | 11/1978 | Oishi |
| 4,131,784 A | 12/1978 | Kimura |
| 4,160,066 A | 7/1979 | Szumachowski |
| 4,186,293 A | 1/1980 | Gonzalez |
| 4,282,420 A | 8/1981 | Banks |
| 4,343,984 A | 8/1982 | Smith |
| 4,430,122 A | 2/1984 | Pauga |
| 4,449,031 A | 5/1984 | Kotecki |
| 4,517,441 A | 5/1985 | Kaljee |
| 4,551,610 A | 11/1985 | Amata |
| 4,584,459 A | 4/1986 | Merrick |
| 4,833,296 A | 5/1989 | Crockett |
| 4,843,212 A | 6/1989 | Shneerov |
| 4,940,882 A | 7/1990 | Bates |
| 5,003,155 A | 3/1991 | Chai |
| 5,365,036 A | 11/1994 | Crockett |
| 5,369,244 A | 11/1994 | Kulikowski |
| 5,389,583 A | 2/1995 | Schulze |
| 5,438,083 A | 8/1995 | Takimoto |
| 5,686,002 A | 11/1997 | Flood |
| 5,824,992 A | 10/1998 | Nagarajan |
| 5,857,141 A | 1/1999 | Keegan |
| 6,242,113 B1 | 6/2001 | Kiser |
| 6,339,209 B1 | 1/2002 | Kotecki |
| 6,674,047 B1 | 1/2004 | Hughes |
| 6,723,954 B2 | 4/2004 | Nikodym |
| 6,784,401 B2 | 8/2004 | North |
| 6,835,913 B2 | 12/2004 | Duncan |
| 6,940,042 B2* | 9/2005 | Hara ............. B23K 35/3053 219/146.1 |
| 7,087,860 B2 | 8/2006 | Nikodym |
| 7,091,448 B2 | 8/2006 | North |
| 7,678,203 B2 | 3/2010 | James |
| 8,758,901 B2 | 6/2014 | Nakamura |
| 9,764,429 B2 | 9/2017 | Chen |
| 2001/0008235 A1 | 7/2001 | Miszczak |
| 2002/0079301 A1 | 6/2002 | Bong |
| 2004/0020912 A1 | 2/2004 | Hara |
| 2004/0026396 A1 | 2/2004 | Nikodym |
| 2005/0189337 A1 | 9/2005 | Baune |
| 2006/0151453 A1 | 7/2006 | Gordon |
| 2006/0163231 A1* | 7/2006 | Kobayashi ........... C22C 38/42 219/146.23 |
| 2006/0165552 A1 | 7/2006 | Kapoor |
| 2006/0207984 A1 | 9/2006 | Karogal |
| 2006/0219684 A1 | 10/2006 | Katiyar |
| 2006/0219685 A1 | 10/2006 | Karogal |
| 2006/0255026 A1 | 11/2006 | North |
| 2007/0017956 A1 | 1/2007 | Karogal |
| 2007/0193995 A1 | 8/2007 | Kapoor |
| 2008/0057341 A1 | 3/2008 | Bouillot |
| 2008/0264924 A1 | 10/2008 | Duncan |
| 2008/0272100 A1 | 11/2008 | Amata |
| 2009/0045172 A1 | 2/2009 | Vanerk |
| 2009/0298024 A1 | 12/2009 | Batzler |
| 2010/0101780 A1 | 4/2010 | Ballew |
| 2010/0224610 A1 | 9/2010 | Wallace |
| 2011/0316516 A1 | 12/2011 | Schiefermuller |
| 2012/0057240 A1 | 3/2012 | Sundell |
| 2013/0078031 A1 | 3/2013 | Nakamura |
| 2013/0313240 A1 | 11/2013 | Amata |
| 2014/0083981 A1 | 3/2014 | Amata |
| 2014/0097168 A1* | 4/2014 | Ferree ............. B23K 35/3093 219/145.22 |
| 2014/0349136 A1 | 11/2014 | Barhorst |

FOREIGN PATENT DOCUMENTS

| | | |
|---|---|---|
| CN | 102233497 | 11/2011 |
| CN | 102581513 | 7/2012 |
| CN | 103418940 A | 12/2013 |
| CN | 103418940 B | 12/2013 |
| DE | 4112371 | 10/1992 |
| DE | 9319668 | 4/1995 |
| DE | 102010026894 | 1/2012 |
| EP | 0012728 | 6/1980 |
| EP | 0688630 | 12/1995 |
| EP | 1226897 | 7/2002 |
| EP | 1728584 | 12/2006 |
| EP | 1775060 | 4/2007 |
| EP | 2343149 | 7/2011 |
| EP | 2567776 | 3/2013 |
| EP | 2855081 | 4/2015 |
| GB | 739375 | 10/1955 |
| GB | 1143600 | 2/1969 |
| GB | 1183463 | 3/1970 |
| GB | 2204324 | 11/1988 |
| JP | S5794626 | 6/1982 |
| JP | S58196192 | 11/1983 |
| JP | S6167597 | 4/1986 |
| JP | H0475783 | 3/1992 |
| JP | 04356397 | 12/1992 |

(56) References Cited

FOREIGN PATENT DOCUMENTS

| JP | H1123434 | 1/1999 | |
|---|---|---|---|
| JP | 2003266194 | 9/2003 | |
| JP | 2007054868 | 3/2007 | |
| RU | 2253556 | 6/2005 | |
| RU | 2253556 C1 * | 6/2005 | ......... B23K 35/3053 |
| WO | 9934950 | 7/1999 | |
| WO | 0163974 | 8/2001 | |
| WO | 0212581 | 2/2002 | |
| WO | 2013177480 | 11/2013 | |
| WO | 2014058725 | 4/2014 | |

OTHER PUBLICATIONS

American Welding Online, "Efforts to Reduce Manganese Fume Emissions During Flux Cored Arc Welding of Standard Carbon Steels," posted Apr. 16, 2014 at 11:53 am, http://awo.aws.org/2014/04/efforts-to-reduce-manganese-fume-emissions-during-flux-cored-arc-welding-of-standard-carbon-steels/.

American Welding Society F1.2:2006, Laboratory Method for Measuring Fume Generation Rate and Total Fume Emission of Welding and Allied Processes, Jan. 28, 2006, pp. 4-6.

American Welding Society F3.2M/F3.2:2001, Ventilation Guide for Weld Fume, Annex B, C, and D, Jan. 1, 2001, pp. 21-26.

Guide for Estimating Welding Emissions for EPA and Ventilation Permit Reporting, American Welding Society F1.6:2003, Feb. 25, 2003, 6 pgs.

International Search Report from PCT application No. PCT/US2013/042565, dated Sep. 13, 2013, 14 pgs.

International Search Report from PCT application No. PCT/US2014/036507, dated Feb. 16, 2015, 11 pgs.

International Search Report from PCT application No. PCT/US2014/053020, dated Nov. 18, 2014, 14 pgs.

International Search Report from PCT application No. PCT/US2015/039451, dated Dec. 2, 2015, 13 pgs.

Int'l Search Report and Written Opinion Appln No. PCT/US2015/041462, dated Dec. 4, 2015, 14 pgs.

International Search Report from PCT application No. PCT/US2016/065717, dated Feb. 7, 2017, 14 pgs.

Safety in Welding, Cutting, and Allied Processes, an American National Standard, American Welding Society, Mar. 9, 2012, pp. 1-70.

International Search Report from PCT application No. PCT/US2014/063844, dated Jan. 27, 2015, 13 pgs.

Canadian Office Action Appln No. 3,005,360 dated Mar. 19, 2019.

\* cited by examiner

SYSTEMS AND METHODS FOR LOW-MANGANESE WELDING ALLOYS

CROSS REFERENCE TO RELATED APPLICATIONS

This application is a continuation of U.S. patent application Ser. No. 16/821,614, filed Mar. 17, 2020, which is a continuation of U.S. patent application Ser. No. 15/847,282, filed Dec. 19, 2017, which is a continuation of U.S. patent application Ser. No. 14/457,599, filed Aug. 12, 2014, now U.S. Pat. No. 9,844,838, which is a continuation-in-part of U.S. patent application Ser. No. 14/265,750, filed Apr. 30, 2014, now U.S. Pat. No. 9,895,774, which claims priority to U.S. Provisional Patent Application Ser. No. 61/821,064, entitled filed May 8, 2013. The entireties of U.S. patent application Ser. Nos. 16/821,614, 15/847,282, 14/457,599, 14/265,750, and 61/821,064, each entitled, "SYSTEMS AND METHODS FOR LOW-MANGANESE WELDING ELECTRODES," are incorporated herein by reference.

BACKGROUND

The present disclosure relates generally to welding alloys and, more specifically, to welding consumables (e.g., welding wires and rods) for welding, such as Gas Metal Arc Welding (GMAW), Gas Tungsten Arc Welding (GTAW), Shielded Metal Arc Welding (SMAW), and Flux Core Arc Welding (FCAW).

Welding is a process that has become ubiquitous in various industries for a variety of applications. For example, welding is often used in applications such as shipbuilding, offshore platform, construction, pipe mills, and so forth. Certain welding techniques (e.g., Gas Metal Arc Welding (GMAW), Gas-shielded Flux Core Arc Welding (FCAW-G), Self-shielded Flux Core Arc Welding (FCAW-S), and Submerged Arc Welding (SAW)), typically employ a welding consumable in the form of welding wire. Other welding techniques (e.g., Shielded Metal Arc Welding (SMAW) and Gas Tungsten Arc Welding (GTAW)) may utilize a welding consumable in the form of a stick or rod. These types of welding consumables may generally provide a supply of filler metal to form the weld deposits on a workpiece.

BRIEF DESCRIPTION

In an embodiment, a welding consumable includes less than approximately 1 wt % manganese, as well as one or more strengthening agents selected from the group: nickel, cobalt, copper, carbon, molybdenum, chromium, vanadium, silicon, and boron. Additionally, the welding consumable has a carbon equivalence (CE) value that is less than approximately 0.23. The welding consumable also includes one or more grain control agents selected from the group: niobium, tantalum, titanium, zirconium, and boron, wherein the welding consumable includes less than approximately 0.6 wt % grain control agents. The welding consumable is designed to provide a manganese fume generation rate of less than approximately 0.01 grams per minute during a welding operation.

In another embodiment, a method of forming a weld deposit during a welding operation includes advancing a welding consumable toward a structural steel workpiece, wherein the welding consumable comprises less than approximately 1 wt % manganese. The method includes establishing an arc between a welding electrode and the structural steel workpiece. The method also includes melting a portion of the welding consumable and a portion of the structural steel workpiece to form the weld deposit, wherein the welding operation generates less than approximately 0.01 grams of manganese fumes per minute.

In another embodiment, a weld deposit is formed on a steel workpiece using an arc welding operation and a welding consumable that produces less than approximately 0.01 grams of manganese fumes per minute. The weld deposit comprises: less than approximately 1 wt % manganese; a tensile strength greater than or equal to approximately 70 ksi; a yield strength greater than or equal to approximately 58 ksi; a ductility, as measured by percent elongation, that is at least approximately 22%; and a Charpy V-notch (CVN) toughness greater than or equal to approximately 20 ft-lbs at −20° F.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
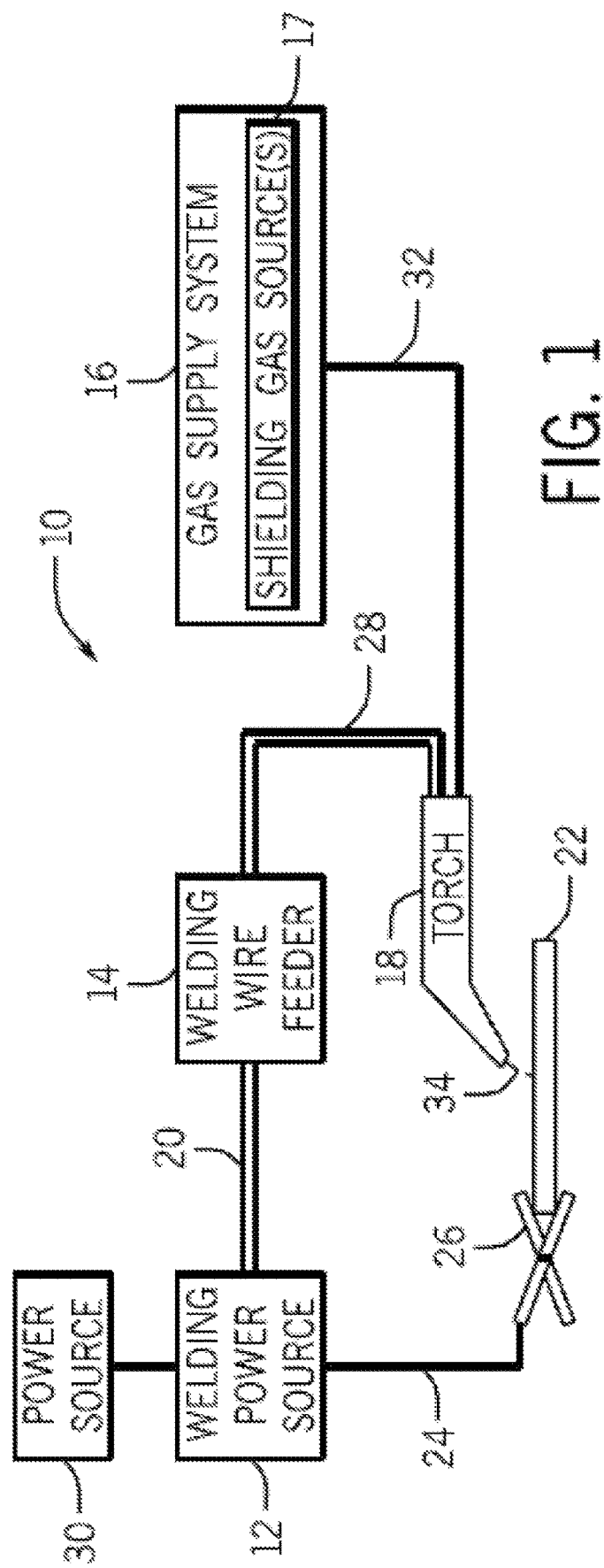
FIG. 1 is a block diagram of a gas metal arc welding (GMAW) system, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be appreciated that, as used herein, the term "tubular welding electrode" or "tubular welding wire" may refer to any welding wire or electrode having a metal sheath and a granular or powdered core, such as metal-cored or flux-cored welding electrodes. It should be appreciated that the term "tubular," as used herein, may include various shapes of welding wire, including round, elliptical, square, polygonal, or any other suitable shape. It should be appreciated that the phrase "substantially free from/of" with respect to a particular component may refer to the particular component being present in only trace concentrations (e.g., less than approximately 0.01%, less than approximately 0.001%, or less than approximately 0.0001%) or being completely absent (e.g., 0 wt % or below a detection limit).

Present embodiments are directed toward alloys for use in welding applications (e.g., as welding consumables). For example, presently disclosed welding alloys may, in certain embodiments, be formed into solid welding wires (e.g., for use in GMAW or SAW applications). In certain embodiments, the disclosed welding alloys may be formed into wire, cut into lengths, and then coated with a flux to form stick electrodes (e.g., for SMAW applications). In other embodiments, the presently disclosed alloy may be formed into a sheath of a tubular welding wire and filled with a granular core material to yield a flux-cored or metal-cored welding wire (e.g., for FCAW-G or FCAW-S applications). In certain embodiments, the disclosed welding alloys may be formed into wires and cut into lengths of rod for use in Gas Tungsten Arc Welding (GTAW) applications. As such, it may be appreciated that the presently disclosed alloy may be useful for the production of any number of welding consumables.

In particular, the presently disclosed welding alloys have a low manganese content. More specifically, the disclosed welding alloy embodiments include less than approximately 2 wt % manganese, such as less than approximately 1.5 wt % manganese, less than approximately 1 wt % manganese, less than approximately 0.9 wt % manganese, or even only including trace manganese content. Accordingly, as set forth in detail below, the disclosed welding alloys enable the production of welding consumables (e.g., welding wires and rods) that have between approximately 5% and approximately 95% less manganese content than other welding consumables, and these welding consumables enable the production of low-manganese weld deposits and low-manganese welding fumes. Further, the presently disclosed welding alloys are useful for welding structural steel (e.g., mild steel, low-alloy steels, carbon steel, or other suitable structural steel) and non-structural steel (e.g., chrome-moly steel). The presently disclosed welding alloys provide weld deposit properties (e.g., tensile strength, yield strength, etc.) that match or exceed the properties of weld deposits formed using welding consumables having substantially higher manganese content. For example, present embodiments enable the formation of a weld deposit having a manganese content less than approximately 2 wt % that provides a suitable tensile strength (e.g., at least 70 kilopound per square inch (ksi)) as well as a suitable toughness (e.g., a Charpy V-notch (CVN) toughness at least 20 ft-lbs at −20° F.), despite the low-manganese content of the weld deposit.

Furthermore, while the presently disclosed welding alloy may be used in the production of several different types of welding consumables (e.g., filler rods, stick electrodes, flux-cored wires, metal-cored wires, or solid electrodes), certain present embodiments are particularly suited for forming solid welding wires. It may be appreciated that, in general, solid welding wires produce less welding fumes than flux-cored welding wires, and generally provide a clean weld deposit that has little or no slag. In contrast, flux-cored welding wires generally form a weld deposit that includes a slag layer that is typically removed after the welding operation is complete. However, while the removal of the slag layer formed by flux-cored welding wires may consume more operator time post-welding, in certain embodiments, this slag layer may advantageously serve to remove or reduce the concentration of undesirable elements from the weld pool during welding, which may provide greater control over the chemistry of the resulting weld deposit.

As presented below, these weld deposit properties are achieved despite the low manganese content through the inclusion of one or more strengthening agents (e.g., nickel, cobalt, copper, carbon, molybdenum, chromium, vanadium, silicon, and/or boron) and one or more grain control agents (e.g., niobium, tantalum, titanium, zirconium, and/or boron) in the welding alloy. In other words, it is believed that the addition of one or more strengthening agents and/or one or more grain control agents enables satisfactory weld deposit properties to be achieved, in spite of the low-manganese levels, when welding steel workpieces (e.g., structural steel workpieces). Additionally, in certain embodiments, it is believed that including one or more grain control agents (e.g., niobium, tantalum, titanium, zirconium, and/or boron) in the welding alloy also compensates for the lower manganese levels such that satisfactory mechanical properties (e.g., toughness, tensile strength, etc.) of the weld deposit may be attained, despite the relatively low manganese levels, when welding steel workpieces (e.g., structural steel workpieces). Further, as discussed in detail below, the components (e.g., the one or more strengthening agents) are present in the welding alloy in suitable relative concentrations such that the welding alloy has a carbon equivalence value (CE) that is generally less than approximately 0.23 (e.g., between approximately 0.07 and approximately 0.12).

Welding System

Turning to the figures, FIG. 1 illustrates an embodiment of a gas metal arc welding (GMAW) system 10 that utilizes a welding electrode (e.g., welding wire or a welding stick or rod) manufactured from a welding alloy in accordance with the present disclosure. It should be appreciated that while the present discussion may focus specifically on the GMAW system 10 illustrated in FIG. 1, the presently disclosed welding alloy may benefit a number of different welding processes (e.g., FCAW-S, FCAW-G, GTAW, SAW, or similar welding processes) that use a welding consumable, such as a welding wire or rod. The welding system 10 includes a welding power source 12, a welding wire feeder 14, a gas supply system 16, and a welding torch 18. The welding power source 12 generally supplies power to the welding system 10 and may be coupled to the welding wire feeder 14 via a cable bundle 20. The welding power source 12 may also be coupled to a workpiece 22 using a lead cable 24 having a clamp 26. In the illustrated embodiment, the welding wire feeder 14 is coupled to the welding torch 18 via a cable bundle 28 in order to supply consumable welding wire (e.g., the welding electrode) and power to the welding torch 18 during operation of the welding system 10. In another embodiment, the welding power source 12 may couple and directly supply power to the welding torch 18.

The welding power source 12 may generally include power conversion circuitry that receives input power from an alternating current power source 30 (e.g., an AC power grid, an engine/generator set, or a combination thereof), conditions the input power, and provides DC or AC output power via the cable 20. For example, in certain embodiments, the power source 30 may be a constant voltage (CV) power source 30. The welding power source 12 may power the welding wire feeder 14 that, in turn, powers the welding torch 18, in accordance with demands of the welding system 10. The lead cable 24 terminating in the clamp 26 couples the welding power source 12 to the workpiece 22 to close the circuit between the welding power source 12, the workpiece 22, and the welding torch 18. The welding power source 12 may include circuit elements (e.g., transformers, rectifiers, switches, and so forth) capable of converting the AC input power to a direct current electrode positive (DCEP) output, direct current electrode negative (DCEN) output, DC variable polarity, pulsed DC, or a variable balance (e.g., balanced or unbalanced) AC output, as dictated by the demands of the welding system 10. It should be appreciated that the presently disclosed welding alloy may enable improvements to the welding process (e.g., improved arc stability and/or improved weld quality) for a number of different power configurations.

The illustrated welding system 10 includes a gas supply system 16 that supplies a shielding gas or shielding gas mixtures from one or more shielding gas sources 17 to the welding torch 18. A shielding gas, as used herein, may refer to any gas or mixture of gases (e.g., inert or active gasses) that may be provided to the arc and/or weld pool in order to provide a particular local atmosphere (e.g., to shield the arc, improve arc stability, limit the formation of metal oxides, improve wetting of the metal surfaces, alter the chemistry of the weld deposit, and so forth). In the depicted embodiment, the gas supply system 16 is directly coupled to the welding torch 18 via a gas conduit 32. In another embodiment, the gas supply system 16 may instead be coupled to the wire feeder 14, and the wire feeder 14 may regulate the flow of gas from the gas supply system 16 to the welding torch 18. In other embodiments, such as certain FCAW-S, SMAW and SAW systems that may not rely on an externally supplied shielding gas, the welding system 10 may not include the gas supply system 16. For such embodiments, the welding electrode may include flux (e.g., a flux core or a flux coating) that at least partially decomposes near the surface of the workpiece 22 during a welding operation to provide a localized shielding atmosphere.

In certain embodiments, the shielding gas flow may be a shielding gas or shielding gas mixture (e.g., argon (Ar), helium (He), carbon dioxide ($CO_2$), oxygen ($O_2$), nitrogen ($N_2$), hydrogen ($H_2$), similar suitable shielding gases, or any mixtures thereof). For example, a shielding gas flow (e.g., delivered via the gas conduit 32) may include Ar, $CO_2$, Ar/$CO_2$ mixtures (e.g., 75% Ar and 25% $CO_2$, 90% Ar and 10% $CO_2$, 95% Ar and 5% $CO_2$, and so forth), Ar/$CO_2$/$O_2$ mixtures, Ar/He mixtures, and so forth. Further, it may be appreciated that, as set forth in detail below, certain shielding gases (e.g., certain Ar/$CO_2$ mixtures, such as 90% Ar/10% $CO_2$) may reduce a total amount of welding fumes that may be generated during the welding operation. For example, in certain embodiments, the shielding gas flow may include between approximately 0% and 100% $CO_2$, with the remainder of the shielding gas flow being argon, helium, or another suitable gas. In certain embodiments, shielding gas flows including three or more gases (e.g., trimix) are also presently contemplated. Additionally, in certain embodiments, the shielding gas mixture may be provided to the arc at a rate of approximately 35 cubic feet per hour (cfh) to approximately 55 cfh (e.g., approximately 40 cfh).

Accordingly, the illustrated welding torch 18 generally receives the welding wire from the welding wire feeder 14, power from the welding power source 12, and a shielding gas flow from the gas supply system 16 in order to perform GMAW of the workpiece 22. In certain embodiments, the welding wire feeder 14 may be a constant speed welding wire feeder 14. During operation, the welding torch 18 may be brought near the workpiece 22 so that an arc 34 may be formed between the consumable welding electrode (i.e., the welding wire exiting a contact tip of the welding torch 18) and the workpiece 22. Additionally, as discussed below, by controlling the composition of the welding wire, the chemical and mechanical properties of the resulting weld may be varied. For example, in certain embodiments, the welding wire may include alloying components to contribute species (e.g., nickel, molybdenum, silicon, carbon, or other suitable alloying components) to the weld pool, affecting the mechanical properties (e.g., strength and toughness) of the weld. Furthermore, certain components of the welding wire may also provide additional shielding atmosphere near the arc, affect the transfer properties of the arc, clean the surface of the workpiece, and so forth.

Welding Alloy Compositions

As discussed in detail below, the presently disclosed welding alloys may include a number of components. While these components may be grouped into various categories (e.g., alloying agents, strengthening agents, grain control agents, deoxidizing agents, and so forth), it should be appreciated that certain components may serve multiple roles during the welding process. As such, it may be appreciated that a disclosure herein of a particular component serving a particular role does not preclude that component from serving other roles or performing other functions during the welding process. For example, as set forth below, in certain embodiments, the disclosed welding alloy may include strengthening agents (i.e., nickel, cobalt, copper, carbon, molybdenum, chromium, vanadium, silicon, boron, or combinations thereof) and/or grain control agents (i.e., niobium, tantalum, titanium, zirconium, boron, or combinations thereof) in order to produce a weld deposit having suitable mechanical properties (e.g., suitable tensile strength and toughness for structural steel applications).

TABLE 1

Chemical composition for three disclosed classes of welding alloys, in accordance with embodiments of the present approach. Values are listed in terms of weight percent (wt %) relative to the total weight of the alloy.

|  | A1 (wt %) | A2 (wt %) | A3 (wt %) |
|---|---|---|---|
| Carbon | 0.001-0.12 | 0.05-0.07 | 0.04-0.06 |
| Manganese | 0.05-2 | 0.3-0.4 | 0.3-0.4 |
| Silicon | 0.1-1.2 | 0.65-0.85 | 0.65-0.85 |
| Nickel | 0-5.0 | 0.65-0.85 | 0.65-0.85 |
| Cobalt | 0-2 | 0.001-0.7 | 0.001-0.7 |
| Chromium | 0-0.8 | 0.001-0.2 | 0.001-0.2 |
| Molybdenum | 0-1.5 | 0.001-0.1 | 0.001-0.1 |
| Vanadium | 0-0.1 | 0.0001-0.03 | 0.0001-0.03 |
| Copper | 0.001-2 | 0.001-0.2 | 0.1-0.2 |
| Titanium | 0.01-0.2 | 0.04-0.16 | 0.04-0.16 |
| Zirconium | 0.01-0.2 | 0.02-0.1 | 0.02-0.1 |
| Aluminum | 0.001-1 | 0.05-0.1 | 0.001-0.01 |
| Niobium | 0-0.1 | 0.001-0.1 | 0.001-0.01 |
| Tantalum | 0-0.2 | 0.001-0.2 | 0.001-0.2 |
| Boron | 0-0.01 | 0.0001-0.001 | 0.0001-0.001 |
| Antimony | 0-0.25 | 0-0.25 | 0-0.25 |
| Sulfur | 0-0.01 | 0.001-0.01 | 0.001-0.01 |
| Phosphorus | 0-0.01 | 0.001-0.01 | 0.001-0.01 |

TABLE 1-continued

Chemical composition for three disclosed classes of welding alloys, in accordance with embodiments of the present approach. Values are listed in terms of weight percent (wt %) relative to the total weight of the alloy.

|  | A1 (wt %) | A2 (wt %) | A3 (wt %) |
|---|---|---|---|
| Iron | Balance (~84-99) | Balance (~96-98) | Balance (~96-98) |

With the foregoing in mind, Table 1 presents chemical compositions (i.e., ranges in weight percent) for three classes of welding alloys, A1, A2, and A3, in accordance with embodiments of the present approach. It may be appreciated that the welding alloy A1 defines the broadest ranges for the various components and, accordingly, represents the broadest class of the presently disclosed welding alloy embodiments. Further, welding alloys A2 and A3 represent two subclasses or genuses that generally fall within the A1 class and, accordingly, define more narrow ranges for each of the components of the presently disclosed welding alloy embodiments. While ranges are listed for the components of the welding alloy classes A1, A2, and A3 in Table 1, it should be appreciated that the disclosed ranges are not limited to that particular class, subclass, or embodiment. Indeed, in certain embodiments, any disclosed component may be included in a welding alloy embodiment of the present approach in any disclosed range, or any subranges thereof, in any combination, not just the combinations indicated for classes A1, A2, and A3 of Table 1. For example, a welding alloy embodiment of the present approach may include approximately 0 wt % (or only trace amounts) nickel (as set forth for A1 in Table 1), include aluminum in a range between approximately 0.05 wt % and approximately 0.1 wt % (as set forth for A2 in Table 1), and include carbon in a range between approximately 0.04 wt % and approximately 0.06 wt % (as set forth for A3 in Table 1). It may be appreciated that, in certain embodiments, each of the elements of Table 1 that are present in the welding alloy may only be substantially present in metallic or elemental form, meaning that the welding alloy may be substantially free from salts or compounds (e.g., oxides, hydroxides, chlorides, etc.) or may only include a small amount of oxides about the outer surface of the welding alloy. Additionally, Table 2 lists the components of two example solid welding wires, E1 and E2, manufactured from embodiments of the presently disclosed welding alloy. As indicated in Table 2, particular components of the solid welding wire embodiments E1 and E2 are listed in weight percentage values that generally fall within the ranges defined by one or more of the classes A1, A2, and A3 set forth in Table 1.

TABLE 2

Chemical composition for two example embodiments of solid welding wires, E1 and E2, manufactured using welding alloys in accordance with the present approach. Values are listed in terms of weight percent (wt %) relative to the total weight of the wire. Values listed as "less than" are present at levels that are at or near the lower detection limit for that component.

|  | E1 (wt %) | E2 (wt %) |
|---|---|---|
| Carbon | 0.052 | 0.05 |
| Manganese | 0.39 | 0.38 |
| Silicon | 0.75 | 0.79 |
| Nickel | 0.76 | 0.77 |
| Chromium | 0.04 | 0.01 |
| Molybdenum | 0.01 | 0.01 |
| Vanadium | 0.006 | <0.001 |
| Copper | <0.01 | 0.15 |
| Titanium | 0.11 | 0.09 |
| Zirconium | 0.05 | 0.06 |
| Aluminum | 0.08 | 0.005 |
| Niobium | <0.001 | <0.01 |
| Boron | <0.001 | 0.0005 |
| Sulfur | 0.005 | 0.01 |
| Phosphorus | 0.001 | 0.002 |
| Iron | Balance (~98) | Balance (~98) |

As set forth in Table 1, the presently disclosed welding alloy may include between approximately 0.05 wt % and approximately 2 wt % manganese. It may be appreciated that the presence of manganese may generally strengthen the welding alloy. However, as used herein, the term "strengthening agent" is not meant to encompass manganese, but rather encompasses other components (e.g., nickel, cobalt, copper, carbon, molybdenum, chromium, vanadium, silicon, and/or boron) that are incorporated into the weld deposit formed using embodiments the disclosed welding alloy and improve the mechanical properties of the weld deposit, despite the low manganese content. It may be noted, however, that the manganese content is considered when calculating the carbon equivalence (CE) of a particular welding alloy embodiment, as discussed below.

In certain embodiments, the welding alloy may include less than approximately 2 wt % manganese (e.g., less than approximately 1.8 wt %, less than approximately 1.6 wt %, less than approximately 1.4 wt %, or less than approximately 1.2 wt % manganese). In certain embodiments, the welding alloy may include less than approximately 1 wt % manganese (e.g., less than approximately 0.9 wt %, less than approximately 0.8 wt %, less than approximately 0.7 wt %, less than approximately 0.6 wt %, less than approximately 0.5 wt %, or less than approximately 0.4 wt % manganese). More specifically, as indicated in Table 1, in certain embodiments, the welding alloy may include between approximately 0.30 wt % and approximately 0.40 wt % manganese (e.g., approximately 0.38 wt % manganese or approximately 0.39 wt % manganese, as presented in Table 2) or between approximately 0.2 wt % and approximately 0.5 wt % manganese. In other embodiments, the manganese content of the welding alloy may be further reduced, for example, to less than approximately 0.30 wt %, less than approximately 0.25 wt %, less than approximately 0.20 wt %, less than approximately 0.15 wt %, less than approximately 0.10 wt %, less than approximately 0.05 wt %, or to only trace levels. In certain embodiments, the manganese content of the welding alloy may be greater than approximately 0.1 wt %, greater than approximately 0.2 wt %, or greater than approximately 0.3 wt %. In certain embodiments, the welding alloy may be manufactured according to a particular target manganese content (e.g., 0.35 wt %), and the resulting welding alloy may have a manganese content that is approximately equal to the particular target, within a tolerance (e.g., ±25%, ±10%, or ±5%).

In certain embodiments, the manganese content within the welding alloy may be defined based on the desired tensile strength of a weld deposit formed using the welding alloy. For example, in certain embodiments, the welding alloy may include less than or equal to 0.9 wt % manganese and may be capable of forming a weld deposit having a tensile strength between approximately 70 kilopounds per square inch (ksi) and 90 ksi. By further example, in certain embodiments, the welding alloy may include less than or equal to 1.4 wt % manganese and may be capable of forming a weld deposit having a tensile strength between approximately 90 ksi and 120 ksi.

Strengthening Agents

As mentioned above, the disclosed welding alloy may include one or more strengthening agents to provide a weld deposit having suitable mechanical properties (e.g., tensile strength, toughness), despite the lower manganese content of the welding alloy. In certain embodiments, the one or more strengthening agents may include austenite stabilizers (e.g., nickel, carbon, copper, cobalt, etc.), which typically lower the temperature of the solid phase transition from austenite to ferrite and/or raise the transition temperature from delta ferrite to austenite (e.g., retard the ferrite phase) during formation of the weld deposit. Additionally, in certain embodiments, the strengthening agents may, additionally or alternatively, include one or more of molybdenum, chromium, vanadium, silicon, and boron, which are not generally considered to be austenite stabilizers, but may still improve mechanical properties (e.g., tensile strength, toughness) of the resulting weld deposit, in accordance with the present technique. It may be appreciated that the total, combined amount of strengthening agents present in welding alloy embodiments may also be adjusted to provide a particular carbon equivalency (CE) value or range, as discussed in detail below.

As presented in Table 1, the disclosed welding alloy embodiments generally include between approximately 0 wt % (i.e., none or trace amounts) and approximately 5 wt % nickel as a strengthening agent that may improve the mechanical properties of a weld deposit. In certain embodiments, the welding alloy may include between approximately 0.01 wt % and approximately 5 wt %, between approximately 0.2 wt % and approximately 4 wt %, between approximately 0.3 wt % and approximately 3 wt %, between approximately 0.4 wt % and approximately 2 wt %, or between approximately 0.5 wt % and approximately 1 wt % nickel. More specifically, in certain embodiments, the welding alloy may include between approximately 0.65 wt % and 0.85 wt % nickel (e.g., approximately 0.76 wt % nickel or approximately 0.77 wt % nickel, as presented in Table 2). Further, certain embodiments, the welding alloy may include between approximately 0.35 wt % and approximately 0.45 wt % or between approximately 1.75 wt % and approximately 2.75 wt % nickel. In certain embodiments, a nickel content of the welding alloy may be greater than approximately 0.01 wt %, greater than approximately 0.1 wt %, greater than approximately 0.15 wt %, greater than approximately 0.2 wt %, less than approximately 5 wt %, less than approximately 0.01 wt %, or less than approximately 0.001 wt %.

As also presented in Table 1, the disclosed welding alloy embodiments generally include between approximately 0 wt % (i.e., none or trace amounts) and approximately 2 wt % cobalt as a strengthening agent that may improve the mechanical properties of a weld deposit. For example, in certain embodiments, the welding alloy may include between approximately 0.01 wt % and approximately 2 wt %, between approximately 0.02 wt % and approximately 1.5 wt %, between approximately 0.03 wt % and approximately 1.0 wt %, between approximately 0.04 wt % and approximately 0.8 wt %, or between approximately 0.05 wt % and approximately 0.7 wt % cobalt. In certain embodiments, a cobalt content of the welding alloy may be greater than approximately 0.01 wt %, greater than approximately 0.05 wt %, less than approximately 2 wt %, less than approximately 0.7 wt %, less than approximately 0.01 wt %, or less than approximately 0.001 wt %.

As also presented in Table 1, the disclosed welding alloy embodiments generally include between approximately 0.001 wt % and approximately 2 wt % copper as a strengthening agent that may improve the mechanical properties of a weld deposit. For example, in certain embodiments, the welding alloy may include between approximately 0.001 wt % and approximately 0.7 wt %, between approximately 0.005 wt % and approximately 0.4 wt %, or between approximately 0.01 wt % and approximately 0.2 wt % copper (e.g., approximately 0.15 wt % copper or less than approximately 0.01 wt % copper, as presented in Table 2). In certain embodiments, a copper content of the welding alloy may be greater than approximately 0.05 wt %, less than approximately 2 wt %, less than approximately 0.7 wt %, less than approximately 0.2 wt %, or less than approximately 0.01 wt %.

As also presented in Table 1, the disclosed welding alloy embodiments generally include between 0.001 wt % and approximately 0.12 wt % carbon as a strengthening agent that may improve the mechanical properties of a weld deposit. More specifically, in certain embodiments, the welding alloy may include between approximately 0.04 wt % and approximately 0.07 wt %, or between approximately 0.05 wt % and approximately 0.06 wt % carbon (e.g., approximately 0.05 wt % carbon or approximately 0.052 wt % carbon, as presented in Table 2). In certain embodiments, a carbon content of the welding alloy may be greater than approximately 0.001 wt %, greater than approximately 0.01 wt %, greater than approximately 0.04 wt %, less than approximately 0.12 wt %, less than approximately 0.07 wt %, or less than approximately 0.06 wt %.

As also presented in Table 1, the disclosed welding alloy embodiments generally include between 0 wt % (i.e., none or trace amounts) and approximately 1.5 wt % molybdenum as a strengthening agent (i.e., a non-austenite strengthening agent) that may improve the mechanical properties of a weld deposit. For example, in certain embodiments, the welding alloy may include between approximately 0.001 wt % and approximately 1 wt % or between approximately 0.005 wt % and approximately 0.5 wt % molybdenum (e.g., approximately 0.01 wt % molybdenum, as presented in Table 2). In certain embodiments, the molybdenum content of the welding alloy may be greater than approximately 0.001 wt %, greater than approximately 0.01 wt %, less than approximately 0.1 wt %, or less than approximately 1.5 wt %.

As also presented in Table 1, the disclosed welding alloy embodiments generally include between 0 wt % (i.e., none or trace amounts) and approximately 0.8 wt % chromium as a strengthening agent (i.e., a non-austenite strengthening agent) that may improve the mechanical properties of a weld deposit. For example, in certain embodiments, the welding alloy may include between approximately 0.01 wt % and approximately 0.8 wt % or between approximately 0.01 wt % and approximately 0.2 wt % chromium (e.g., 0.01 wt % or 0.04 wt % chromium). In certain embodiments, the chromium content of the welding alloy may be greater than approximately 0.001 wt %, greater than approximately 0.01 wt %, less than approximately 0.8 wt %, less than approximately 0.2 wt %, or less than approximately 0.1 wt %.

As also presented in Table 1, the disclosed welding alloy embodiments generally include between 0 wt % (i.e., none or trace amounts) and approximately 0.1 wt % vanadium as a strengthening agent (i.e., a non-austenite strengthening agent) that may improve the mechanical properties of a weld deposit. For example, in certain embodiments, the welding alloy may include between approximately 0.0005 wt % and approximately 0.09 wt % or between approximately 0.001 wt % and approximately 0.025 wt % vanadium (e.g., approximately 0.006 wt % vanadium). In certain embodiments, a vanadium content of the welding alloy may be greater than approximately 0.001 wt %, less than approximately 0.1 wt %, less than approximately 0.03 wt %, or less than approximately 0.001 wt %.

As also presented in Table 1, the disclosed welding alloy embodiments generally include between approximately 0.1 wt % and approximately 1.2 wt % silicon. It may be noted that silicon may play more than one role in the formulation of embodiments of the presently disclosed welding alloy. For example, silicon may play a role as a deoxidizer, reacting with oxygen-containing species at or near the weld pool to generate slag. However, the portion of silicon that persists in the weld deposit may also play a role as a strengthening agent (i.e., a non-austenite strengthening agent) to improve the mechanical properties of a weld deposit. As such, the disclosed ranges of silicon in Table 1 include a portion of silicon that is consumed by deoxidation during welding, as well as a portion of silicon that will become incorporated into the weld deposit as a strengthening agent. For example, in certain embodiments, the welding alloy may include between approximately 0.65 wt % and approximately 0.85 wt % silicon (e.g., approximately 0.75 wt % silicon or approximately 0.79 wt % silicon, as presented in Table 2). In certain embodiments, the silicon content of the welding alloy may be greater than approximately 0.1 wt %, greater than approximately 0.65 wt %, less than approximately 0.85 wt %, or less than approximately 1.2 wt %. Silicon content is also discussed below with respect to deoxidizing components of the disclosed welding alloy embodiments.

As also presented in Table 1, the disclosed welding alloy embodiments generally include between approximately 0 wt % (i.e., none or trace amounts) and approximately 0.01 wt % boron. That is, in certain embodiments, boron may not be included in welding alloy embodiments of the present approach without adversely affecting the properties of the welding alloy and/or the resulting weld deposit. However, in certain embodiments, boron may be included in a small amount to improve the mechanical properties of the resulting weld deposit. For example, in certain embodiments, the welding alloy may include between approximately 0.0001 wt % and approximately 0.001 wt % boron (e.g., 0.0005 wt % boron or <0.001 wt % boron, as presented in Table 2). In certain embodiments, the boron content of the welding alloy may be greater than approximately 0.0001 wt %, less than approximately 0.001 wt %, or less than approximately 0.01 wt %. It may be appreciated that boron may be considered both a strengthening agent and a grain control agent, as discussed herein. That is, the amount of boron present in a welding alloy embodiment generally contributes to both the carbon equivalence value and to the total amount of grain control agents, as discussed below.

Carbon Equivalence (CE)

As mentioned above, welding alloy embodiments of the present approach generally include certain components, namely manganese and one or more strengthening agents, at suitable levels to provide a particular equivalent carbon content value or range. For example, the disclosed welding alloy embodiments have a particular carbon equivalent (CE) value or range determined according to the Ito and Bessyo method (also known as the critical metal parameter, Pcm) based on the following formula:

$$CE = \% \ C + \% \ Si/30 + (\% \ Mn + \% \ Cu + \% \ Cr)/20 + \% \ Ni/60 + \% \ Mo/15 + \% \ V/10 + 5*\% \ B \qquad \text{Eq. 1}$$

wherein each of the elemental percentages are provided in weight percent relative to the total weight of the welding alloy. For example, in certain embodiments, the welding alloy may have a manganese content less than or equal to 2 wt % (e.g., less than approximately 1 wt % or between 0.3 wt % and 0.4 wt % manganese) and a CE (determined according to equation 1) that is between approximately 0.05 and approximately 0.25. In certain embodiments, the welding alloy may have a CE (determined according to equation 1) that is less than approximately 0.24, less than approximately 0.23, less than approximately 0.22, less than approximately 0.21, less than approximately 0.2, between approximately 0.2 and approximately 0.23, or between approximately 0.08 and approximately 0.23. In certain embodiments, the tubular welding wire 50 may have a CE (determined according to equation 1) selected based on a desired tensile strength. For example, a welding alloy may have a manganese content less than approximately 2 wt % (e.g., less than approximately 1 wt % or between approximately 0.3 wt % and 0.4 wt % manganese) and have CE between approximately 0.2 and approximately 0.23 to provide an estimated tensile strength between approximately 90 ksi and approximately 140 ksi (e.g., approximately 100 ksi). Other embodiments designed to provide a lower estimated tensile strength (e.g., between approximately 70 ksi and approximately 80 ksi) may have a manganese content less than approximately 2 wt % (e.g., less than approximately 1 wt % or between approximately 0.3 wt % and 0.4 wt % manganese) and have a CE value below 0.2, such as between approximately 0.07 and approximately 0.12.

Grain Control Agents

As presented in Table 1 above, the disclosed welding alloy embodiments generally include one or more grain control agents that may improve mechanical properties (e.g., tensile strength, toughness) of the resulting weld deposit. In certain embodiments, these grain control agents may include niobium, tantalum, titanium, zirconium, boron, and combinations thereof. Accordingly, in certain embodiments, the welding alloy may include between approximately 0.02 wt % and approximately 2.3 wt %, between approximately 0.02 wt % and approximately 0.6 wt %, between approximately 0.05 wt % and approximately 0.7 wt %, or between approximately 0.06 wt % and approximately 0.6 wt % combined grain control agents. In certain embodiments, the combined grain control agent content of the welding alloy may be greater than approximately 0.02 wt %, greater than approximately 0.06 wt %, less than approximately 0.6 wt %, or less than approximately 0.56 wt %.

As also presented in Table 1, the disclosed welding alloy embodiments generally include between approximately 0 wt % (i.e., none or trace amounts) and approximately 0.1 wt % niobium as a grain control agent that may improve the mechanical properties of the weld deposit. For example, in certain embodiments, the welding alloy may include between approximately 0.001 wt % and approximately 0.1 wt %, between approximately 0.005 wt % and approximately 0.09 wt %, or between approximately 0.01 wt % and approximately 0.08 wt % niobium. In certain embodiments, the niobium content of the welding alloy may be greater than approximately 0.001 wt %, less than approximately 0.15 wt %, less than approximately 0.12 wt %, or less than approximately 0.1 wt %.

As also presented in Table 1, the disclosed welding alloy embodiments generally include between approximately 0 wt % (i.e., none or trace amounts) and approximately 0.2 wt % tantalum as a grain control agent to improve the mechanical properties of the weld deposit. For example, in certain embodiments, the welding alloy may include between approximately 0.001 wt % and approximately 0.2 wt %, between approximately 0.005 wt % and approximately 0.15 wt %, or between approximately 0.01 wt % and approximately 0.1 wt % tantalum. In certain embodiments, a tantalum content of the welding alloy may be greater than approximately 0.001 wt %, less than approximately 0.2 wt %, or less than approximately 0.1 wt %.

As also presented in Table 1, the disclosed welding alloy embodiments generally include between approximately 0.01 wt % and approximately 0.2 wt % titanium. It may be noted that, like silicon discussed above, titanium may play more than one role in the welding operation. For example, titanium may play a role as a deoxidizer, reacting with oxygen-containing species near the weld pool to generate slag, as discussed below. However, the titanium that persists in the weld deposit may also play a role as a grain control agent that may improve the mechanical properties of the weld deposit. As such, the disclosed ranges of titanium in Table 1 include the titanium that will be consumed by deoxidation (e.g., approximately 60%), as well as the titanium that will become incorporated into the weld deposit during welding. For example, in certain embodiments, the welding alloy may include between approximately 0.01 wt % and approximately 0.18 wt %, between approximately 0.04 wt % and approximately 0.16 wt %, or between approximately 0.08 wt % and approximately 0.12 wt % titanium. In certain embodiments, a titanium content of the welding alloy may be greater than approximately 0.01 wt %, greater than approximately 0.08 wt %, less than approximately 0.2 wt %, or less than approximately 0.16 wt %.

As also presented in Table 1, the disclosed welding alloy embodiments generally include between approximately 0.01 wt % and approximately 0.2 wt % zirconium. It may be noted that, like titanium, zirconium may play more than one role in the welding operation. For example, zirconium may play a role as a deoxidizer, reacting with oxygen-containing species near the weld pool to generate slag, as discussed below. However, the zirconium that persists in the weld deposit after welding may also serve as a grain control agent that may improve the mechanical properties of the weld deposit. As such, the disclosed ranges of zirconium in Table 1 include the portion of zirconium that will be consumed by deoxidation (e.g., approximately 60%), as well as the portion zirconium that will become incorporated into the weld deposit, during welding. For example, in certain embodiments, the welding alloy may include between approximately 0.01 wt % and approximately 0.15 wt % or between approximately 0.02 wt % and approximately 0.1 wt % zirconium. In certain embodiments, a zirconium content of the welding alloy may be greater than approximately 0.01 wt %, greater than approximately 0.02 wt %, greater than approximately 0.04 wt %, less than approximately 0.1 wt %, less than approximately 0.08 wt %, or less than approximately 0.02 wt %.

As mentioned above, the amount of boron present a welding alloy embodiment generally contributes both the carbon equivalence (CE) value and to the total amount of grain control agents present in the welding alloy. As presented in Table 1, the disclosed welding alloy embodiments generally include between approximately 0 wt % (i.e., none or trace amounts) and approximately 0.01 wt % boron. For example, in certain embodiments, the welding alloy may include between approximately 0.0001 wt % and approximately 0.001 wt % boron (e.g., 0.0005 wt % boron or <0.001 wt % boron, as presented in Table 2). In certain embodiments, the boron content of the welding alloy may be greater than approximately 0.0001 wt %, less than approximately 0.001 wt %, or less than approximately 0.01 wt %.

Other Components

Further, as presented in Table 1, in certain embodiments, the solid welding alloy may include deoxidizing components (e.g., titanium, zirconium, aluminum, and silicon) in the indicated ranges. As set forth above, certain deoxidizing components may also serve other roles (e.g., strengthening agents, grain control agents), and these components may be present at levels that enable a suitable portion of these components to become incorporated into the weld deposit to provide these effects. In certain embodiments, antimony may not be included without adversely affecting the present approach; while in other embodiments, antimony (e.g., up to 0.25 wt %) may be useful to tune the properties of the resulting weld deposit. In certain embodiments, the disclosed welding alloy embodiments may include greater than approximately 80 wt % iron (e.g., greater than approximately 83 wt %, greater than approximately 84 wt %, greater than approximately 90 wt %, greater than approximately 95 wt %, greater than approximately 96 wt %, greater than approximately 97 wt %, greater than approximately 98 wt %, greater than approximately 99 wt % iron, or a remainder of iron).

AWS Standards and Classification

Certain welding electrodes (e.g., welding electrodes manufactured according to the American Welding Society (AWS) A5.18 ER70S-2 standard) for welding structural steels include between 0.9 wt % and 1.4 wt % manganese. By comparison, the ER70S-2 wire contains between approximately 2 and approximately 5 times greater manganese content than certain welding alloy embodiments of the present approach, such as a welding alloy embodiment having between approximately 0.3 wt % and approximately 0.4 wt % manganese. Further, based on the AWS specification, the ER70S-2 wire includes less than or equal to 0.15 wt % nickel. By comparison, certain embodiments of the present approach (e.g., embodiments of the subclass A2 and A3 of Table 1) may contain between approximately 4 and approximately 6 times greater nickel content than the ER70S-2 wire. For example, in certain embodiments, the disclosed welding alloy may include less than approximately 1 wt % manganese (e.g., less than or equal to approximately 0.9 wt % manganese, less than approximately 0.4 wt % manganese) and greater than approximately 0.15 wt % nickel (e.g., greater than approximately 0.16 wt %, greater than approximately 0.18 wt %, greater than approximately 0.2 wt %, greater than approximately 0.25 wt %, or greater than approximately 0.75 wt % nickel).

It may be appreciated that the formulations in Tables 1 and 2 are merely provided as example formulations. In certain embodiments, the presently disclosed low-manganese welding alloy may be used to produce a welding consumable (e.g., a solid welding wire, a stick electrode, or a tubular welding wire) in compliance with the chemical analysis requirements of one or more of the following AWS A5.29, A5.20, and/or A5.36 standards: E71T1-GC H8 (e.g., providing similar weld deposit chemistry and mechanical properties as Element™ 71Ni1C, available from Hobart Brothers Company, Troy, OH); E71T1-GM H8 (e.g., providing similar weld deposit chemistry and mechanical properties as Element™ 71Ni1M, available from Hobart Brothers Company, Troy, OH); E71T-1C H8 (e.g., providing similar weld deposit chemistry and mechanical properties as Element™ 71T1C, available from Hobart Brothers Company, Troy, OH); E71T-1M H8 (e.g., providing similar weld deposit chemistry and mechanical properties as Element™ 71T1M, available from Hobart Brothers Company, Troy, OH); E81T1-GC H8 (e.g., providing similar weld deposit chemistry and mechanical properties as Element™ 81K2C, available from Hobart Brothers Company, Troy, OH); and E81T1-GM H8 (e.g., providing similar weld deposit chemistry and mechanical properties as Element™ 81K2M, available from Hobart Brothers Company, Troy, OH).

Manufacturing the Welding Alloy and Welding Consumables

The disclosed welding consumables, including solid welding electrodes, may be formed from a mixture of starting materials or ingredients that may be formed into an alloy using common steel manufacturing processes and techniques. For example, these starting materials may include iron, iron titanium powder, iron zirconium powder, aluminum powder or alumina, as well as other suitable starting materials. For example, in certain embodiments, the starting materials may include one or more materials (e.g., antimony, gallium) set forth in the U.S. Pat. Nos. 6,608,284 and 8,119,951, both of which are incorporated by reference herein in their entireties for all purposes. In general, the various starting materials may be heated within a furnace to reach a molten state. Additionally, one or more impurities (e.g., oxides of titanium, zirconium, aluminum, and/or silicon) may be removed from the mixture as slag. Accordingly, after a portion of certain starting materials are oxidized and removed as slag during formation of the welding alloy, the composition of the resulting welding alloy complies with the component ranges for one or more of the classes A1, A2, and A3 indicated in Table 1. Once formed, in certain embodiments, the welding alloy may be shaped into welding wire (as discussed below), into ribbons (e.g., strip cladding for use in strip welding operations), into bars or plates, or any other type of welding consumable used in a welding operation.

In certain embodiments, the welding alloy may be drawn (e.g., using one or more drawing dies) to form a solid wire (e.g., for use in GMAW, GTAW, and SAW applications). Additionally, in certain embodiments, the solid wire may be cut into segments and covered with a coating to produce stick electrodes. Further, in certain embodiments, the welding alloy may be flattened, shaped into a sheath, and filled with a granular core material (e.g., flux) to produce a metal-cored or a flux-cored tubular welding wire. Even further, in certain embodiments, the welding alloy may be disposed on a workpiece and applied via a plating process. It may be appreciated that, for embodiments of welding consumables that include a flux and/or a coating component (e.g., stick electrodes and/or flux-cored tubular welding wire), the chemistry of the weld deposit, the mechanical properties of the weld deposit, the properties of the arc, and so forth, may be also controlled or tuned based on the composition and nature of the flux and/or coating component. In particular, in certain embodiments, the flux and/or coatings used in combination with the disclosed welding alloys (e.g., for SMAW stick electrodes, within flux-cored electrodes, and for SAW flux) may be substantially free or completely free from manganese.

By specific example, in certain embodiments, the disclosed alloys may be used to manufacture SMAW stick electrodes. In an example, a solid wire may be manufactured from the disclosed welding alloys, cut into segments, and coated with flux to produce stick electrodes suitable for SMAW. In this example, the presently disclosed welding alloys enable the delivery of the aforementioned deoxidizers (e.g., zirconium, titanium, aluminum, and/or silicon) to the arc and/or the weld deposit. In certain embodiments, the SMAW stick electrode may be in compliance with the AWS A5.1 or AWS A5.5 (e.g., classified as an Exx18 or an Exx18-Y electrode) and may have a flux coating that is completely free or substantially free from manganese. In certain embodiments, the solid wire segments may be first coated with another metal (e.g., a deposited metal layer or a metal foil) prior to the application of the flux coating to improve adhesion of the flux coating and/or to limit interaction between certain flux components and the solid wire core. In certain embodiments, the flux coating may be basic (e.g., contributes minimal oxygen to the weld deposit) and may include silicon metal powders that are stabilized (e.g., chromated) prior to use.

As mentioned, in certain embodiments, the welding alloy may be drawn to form a solid wire for use in GMAW, GTAW, and SAW applications. Additionally, in certain embodiments, the solid welding wire may be coated with one or more components to facilitate one or more aspects of the welding process. For example, in certain embodiments, the solid welding wire may be manufactured to include a thin copper coating to facilitate feeding of the welding wire. In certain embodiments, this copper coating may be formed electrolytically or via self-deposition in a vacuum. For embodiments that include this copper coating, the composition of the welding alloy may be adjusted such that the composition of the entire welding electrode (including the coating) falls within the disclosed ranges for the disclosed welding alloys (e.g., A1, A2, and/or A3 of Table 1). Furthermore, in certain embodiments, in addition or in alternative to a copper coating, the solid welding wire may include a lubricant (e.g., an oil-based) coating to further facilitate the feeding of the welding wire. Additionally, in certain embodiments, this lubricant coating may include one or more Group I or Group II compounds (e.g., sodium, potassium, lithium, magnesium, calcium, and/or barium salts) that may provide the solid welding wire with arc stabilizing effects during an arc welding operation.

Weld Deposit

Table 3 illustrates an expected chemical composition and mechanical properties for weld deposits formed using the solid welding electrode embodiments E1 and E2 of Table 2, which are example welding consumables manufactured from the disclosed welding alloys (e.g., welding alloys A1, A2, or A3 of Table 1). As set forth in Table 3, in certain embodiments, the resulting weld deposits may include less than or equal to 1 wt % manganese (e.g., between approximately 0.3 wt % and approximately 0.4 wt % manganese). In certain embodiments, the weld deposit may include less than approximately 1.25 wt %, less than approximately 1 wt %, less than approximately 0.9 wt %, less than approximately 0.8 wt %, less than approximately 0.7 wt %, less than approximately 0.6 wt %, less than approximately 0.5 wt %, less than approximately 0.4 wt %, less than approximately 0.3 wt %, less than approximately 0.2 wt %, less than approximately 0.1 wt %, or only trace amounts of manganese, based on the manganese content of the welding alloy used to form the weld deposit.

TABLE 3

Chemical composition (wt %) and mechanical properties for example weld deposits W1, W2, and W3 formed using the solid welding electrode embodiment E1 of Table 2, and weld deposit W4, W5, and W6 formed using the solid welding electrode embodiment E2 of Table 2, deposited on an A36 base plate. Mechanical properties are determined according to AWS A5.18. The "90/10" shielding gas mixture is approximately 90% argon and approximately 10% $CO_2$. All of the weld deposits are formed in a 1 g position using a solid wire having a diameter of 0.045 inches.

|  | W1 | W2 | W3 | W4 | W5 | W6 |
|---|---|---|---|---|---|---|
| Carbon | 0.068 | 0.065 | 0.068 | 0.077 | 0.083 | 0.067 |
| Manganese | 0.304 | 0.375 | 0.361 | 0.344 | 0.335 | 0.28 |
| Silicon | 0.485 | 0.528 | 0.543 | 0.541 | 0.503 | 0.343 |
| Phosphorus | 0.004 | 0.006 | 0.005 | 0.005 | 0.004 | 0.005 |
| Sulfur | 0.009 | 0.011 | 0.01 | 0.007 | 0.006 | 0.006 |
| Nickel | 0.735 | 0.632 | 0.646 | 0.665 | 0.651 | 0.671 |
| Chromium | 0.03 | 0.029 | 0.027 | 0.021 | 0.024 | 0.027 |
| Molybdenum | 0.008 | 0.009 | 0.009 | 0.007 | 0.01 | 0.006 |
| Vanadium | 0.001 | 0.002 | 0.001 | 0.003 | 0.002 | 0.001 |
| Copper | 0.073 | 0.11 | 0.086 | 0.247 | 0.255 | 0.224 |
| Titanium | 0.046 | 0.043 | 0.053 | 0.042 | 0.034 | 0.021 |
| Zirconium | 0.01 | 0.01 | 0.015 | 0.009 | 0.007 | 0.003 |
| Aluminum | 0.031 | 0.032 | 0.038 | 0.009 | 0.006 | 0.003 |
| Boron | 0.0001 | 0.00011 | 0.0001 | 0.0001 | 0.00016 | 0.0001 |
| Niobium | 0.001 | 0.001 | 0.001 | 0.001 | 0.001 | 0.001 |
| Oxygen | 0.074 | 0.07 | 0.053 | 0.055 | 0.064 | 0.097 |
| Nitrogen | 0.004 | 0.0037 | 0.0039 | 0.0039 | 0.005 | 0.0062 |
| Carbon Equivalance (CE) | 0.12 | 0.12 | 0.12 | 0.14 | 0.14 | 0.12 |
| Shielding Gas | $CO_2$ | $CO_2$ | 90/10 | $CO_2$ | $CO_2$ | $CO_2$ |
| Yield strength (ksi) | 67.6 | 64.1 | 77.4 | 61.4 | 63.7 | 59.9 |
| Tensile strength (ksi) | 77.6 | 74.6 | 87.8 | 76.8 | 76.7 | 72.4 |
| Elongation (% in 2") | 26 | 27.6 | 20.5 | 25.1 | 22.6 | 26.4 |
| Area Reduction % | 62.1 | 67.8 | 47.7 | 58.1 | 50.5 | 59.9 |
| CVN (ft-lbs) at −20° F. | 70.8 | 54.8 | 22 | 93.4 | 36.4 | 34.6 |

As indicated in Table 3, the example weld deposits formed using the disclosed welding alloys include one or more strengthening agents (e.g., nickel, copper, carbon, molybdenum, chromium, vanadium, silicon, and/or boron) and one or more grain control agents (e.g., niobium, tantalum, titanium, and/or zirconium) at particular concentrations that enable the weld deposit to have suitable mechanical properties, despite the lower manganese content. It may be appreciated that, for certain welding operations, such as a TIG welding operation using 100% argon as a shielding gas and a filler rod of the presently disclosed welding alloy, the chemistry of the weld deposit may be substantially the same as the chemistry of the welding alloy, as described in detail above. For example, for certain welding operations, the weld deposit may fall within the ranges defined by the classes A1, A2, or A3 of Table 1, and may include any of the ranges for strengthening agents, grain control agents, carbon equivalency (CE), etc., set forth above for the welding alloy. For other welding operations, such as the GTAW operations used to form the weld deposits W1, W2, W3, W4, and W5 of Table 3, the amounts of one or more components may be altered (e.g., by the chemistry of the base metal or by oxidization), and may therefore be different than the levels of these components in the welding consumable made from the disclosed welding alloy. For example, in certain embodiments, a weld deposit formed using a welding consumable that is an embodiment of the presently disclosed welding alloy may include: a carbon content that is less than approximately 0.12 wt % (e.g., less than approximately 0.07 wt % carbon); a manganese content that is less than approximately 2 wt % (e.g., less than approximately 1 wt %, less than approximately 0.9 wt %, or between approximately 0.3 wt % and approximately 0.4 wt % manganese); a silicon content that is less than approximately 1.2 wt % (e.g., less than approximately 0.6 wt % silicon); a nickel content that is less than approximately 5 wt % (e.g., less than approximately 1 wt %, less than approximately 0.85 wt % nickel); a chromium content that is less than approximately 0.8 wt % (e.g., less than approximately 0.4 wt % chromium); a molybdenum content that is less than approximately 1.5 wt % (e.g., less than approximately 0.01 wt % molybdenum); a vanadium content that is less than approximately 0.1 wt % (e.g., less than approximately 0.03 wt % vanadium); a copper content that is less than approximately 2 wt % (e.g., less than approximately 0.2 wt % copper); a titanium content that is less than approximately 0.2 wt % (e.g., less than approximately 0.06 wt % titanium); a zirconium content that is less than approximately 0.2 wt % zirconium (e.g., less than approximately 0.02 wt % zirconium); an aluminum content less than approximately 1 wt % (e.g., less than approximately 0.04 wt % aluminum); a boron content less than approximately 0.01 wt % (e.g., less than approximately 0.0002 wt % boron); a niobium content that is less than approximately 0.1 wt % (e.g., less than approximately 0.002 wt % niobium); and/or a tantalum content that is less than approximately 0.1 wt % (e.g., less than approximately 0.001 wt % tantalum).

Additionally, Table 3 illustrates examples of the mechanical properties enabled by the presently disclosed welding alloy embodiments, despite the lower manganese content. For example, as presented in Table 3, weld deposits formed using an embodiment of the disclosed welding alloy generally possess a tensile strength that is greater than or equal to 70 ksi, despite having a low manganese content (e.g., less than 1 wt % manganese). In certain embodiments, the weld deposit may have a higher tensile strength, such as between approximately 70 ksi and 80 ksi, between approximately 80 ksi and 90 ksi, between approximately 90 ksi and 100 ksi, or between approximately 100 ksi and 140 ksi. Additionally, as presented in Table 3, weld deposits formed using an embodiment of the disclosed welding alloy generally possess a yield strength that is greater than or equal to 58 ksi. In certain embodiments, the weld deposit may have a higher yield strength, such as between approximately 58 ksi and approximately 75 ksi. Further, as presented in Table 3, weld deposits formed using an embodiment of the disclosed welding alloy generally possess a Charpy V-notch (CVN) value that is greater than or equal to 20 foot pounds (ft-lbs) at −20° F. In certain embodiments, the weld deposit may have a higher CVN value, such as greater than 30 ft-lbs, greater than 40 ft-lbs, greater than 50 ft-lbs, greater than 60 ft-lbs, or greater than 70 ft-lbs.

Welding Fumes

Table 4 includes welding fume data for a series of gas metal arc welding (GMAW) operations using an embodiment of a solid welding wire manufactured from the disclosed A3 welding alloy. The welding fume data of Table 4 is also presented visually in the graphs of FIGS. 2, 3, 4, 5, and 6. While the data of Table 4 and FIGS. 2-6 has been generated using a specific welding consumable embodiment (e.g., E2 solid welding wire of Table 2) of a specific disclosed type of welding alloy (e.g., A3 welding alloy of Table 1), it is believed that the welding fume data presented in Table 4 is representative of other embodiments of welding consumables generally falling within the compositional ranges of the A1 welding alloy of Table 1. Further, while the data of Table 4 was generated using a gas metal arc welding (GMAW) operation, it is believed that the fume data presented in Table 4 is representative of the welding fume data of other welding operations (e.g., submerged arc welding (SAW), shielded metal arc welding (SMAW), or gas tungsten arc welding (GTAW) operations).

TABLE 4

Welding fume data for a series of example welding operations using an embodiment of a solid welding wire made from the disclosed A3 welding alloy (e.g., an embodiment of the disclosed E2 solid welding wire). All welding operations were performed using a 90% argon/10% $CO_2$ shielding gas mixture. Fume testing was performed in accordance with AWS F1.2 using a bead-on-plate in a horizontal (1F) position with an electrical stick-out of between approximately 0.5 inches and approximately 0.75 inches and a wire diameter of 0.045 inches.

| Welding Electrode | Wire Feed Speed (in/min) | Current (A) | Bias (V) | Melt-Off (lbs/hr) | Fume Generation Rate (g/min) | Electrode to fumes | Mn in fumes | Mn Fume Generation Rate (g/min) |
|---|---|---|---|---|---|---|---|---|
| A3 | 100 | 110 | 21 | 6.8036 | 0.134 | 0.65% | 2.50% | 0.00334 |
|  | 250 | 225 | 27 | 6.8036 | 0.283 | 0.55% | 1.60% | 0.00453 |
|  | 300 | 250 | 28 | 8.1632 | 0.284 | 0.46% | 1.80% | 0.00511 |
|  | 355 | 280 | 29 | 9.6558 | 0.434 | 0.59% | 1.30% | 0.00564 |
|  | 425 | 300 | 30 | 11.5688 | 0.332 | 0.54% | 1.50% | 0.00498 |
|  | 500 | 335 | 31 | 13.6038 | 0.122 | 0.12% | 2.20% | 0.00268 |
|  | 700 | 425 | 32 | 19.0382 | 0.101 | 0.07% | 6.40% | 0.00644 |

Figure 2:
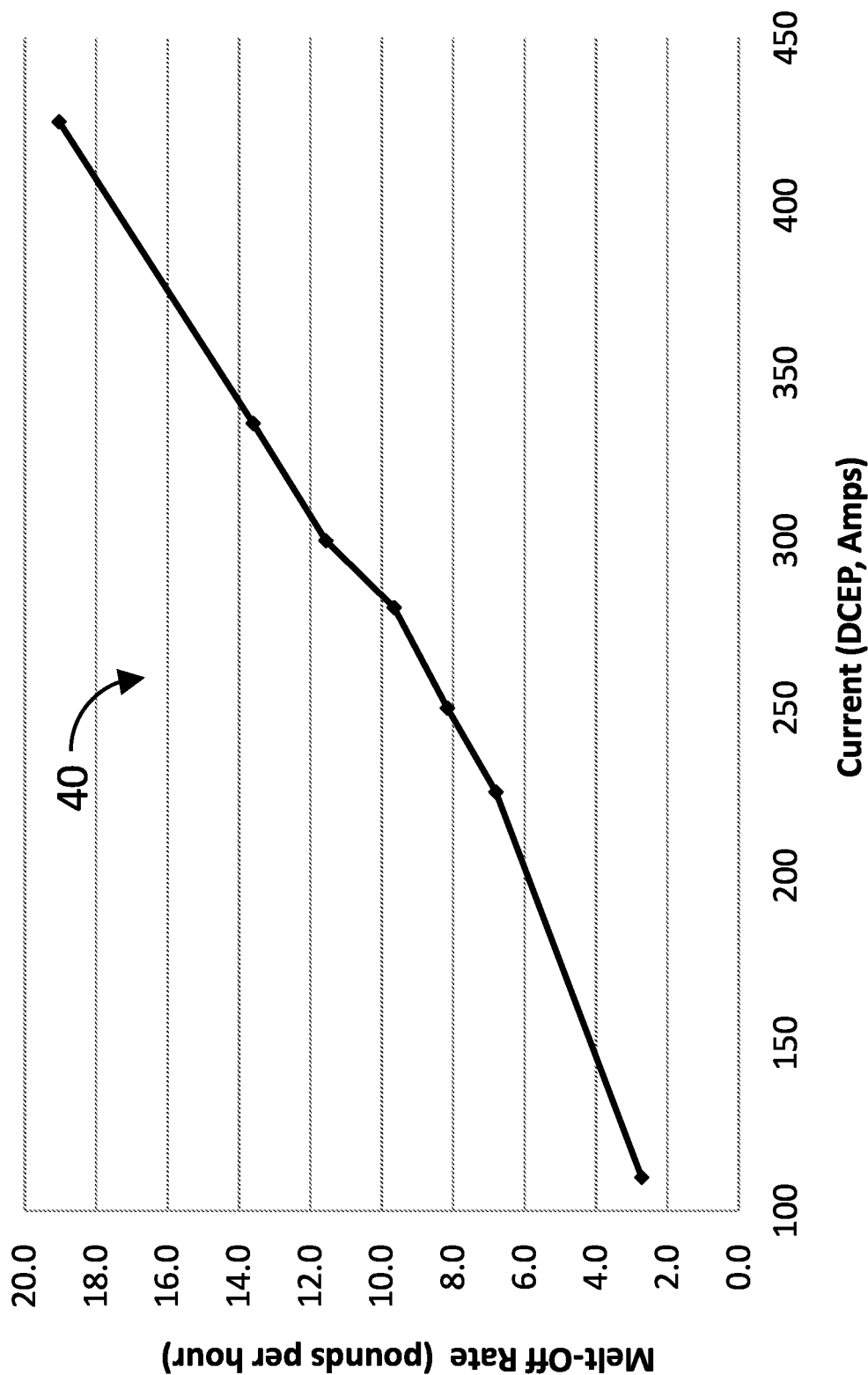
FIG. 2 is a graph illustrating melt-off rate versus welding current for a series of example welding operations using an embodiment of a solid welding electrode of the present disclosure.
Figure 3:
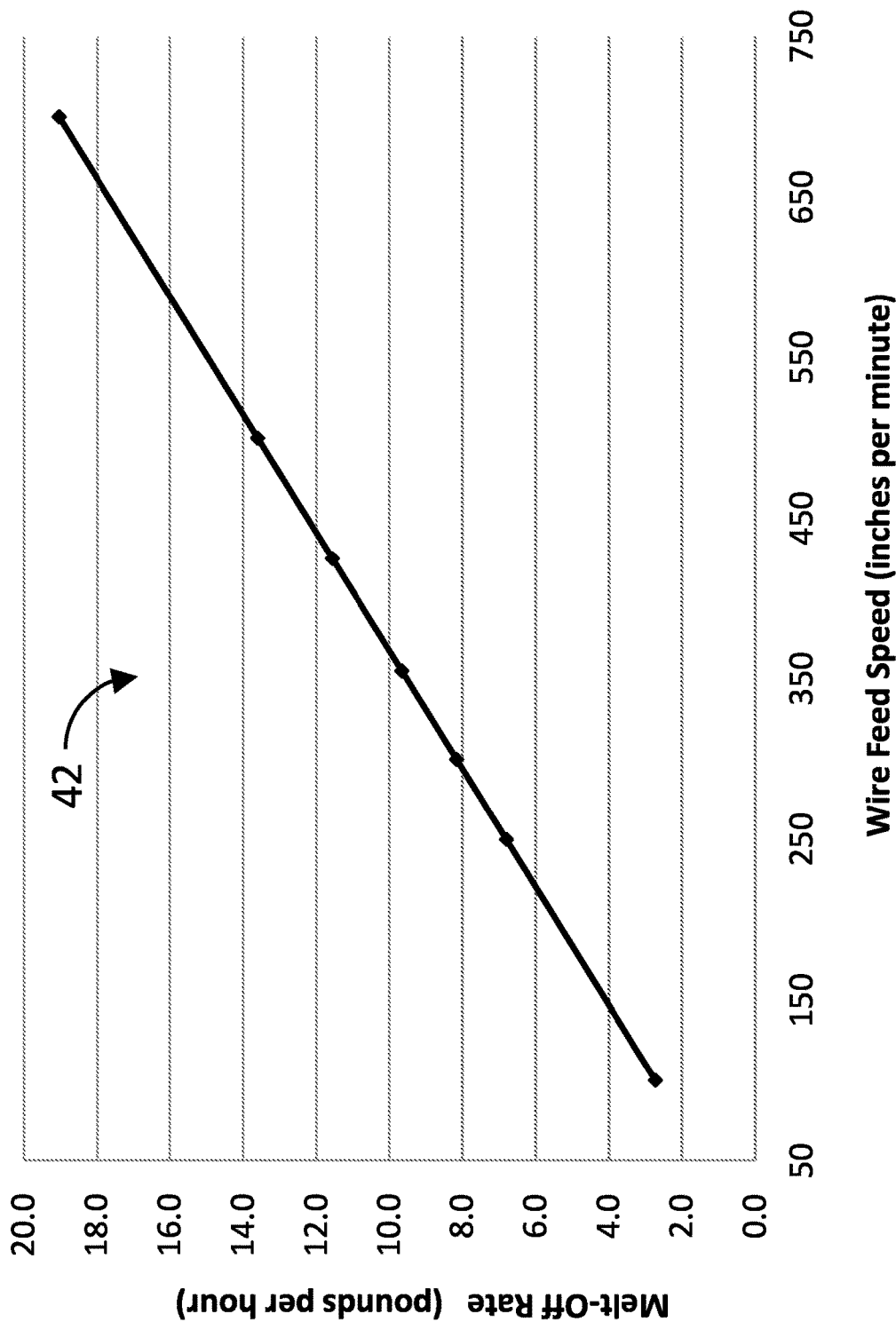
FIG. 3 is a graph illustrating melt-off rate versus wire feed speed for the series of example welding operations using the solid welding electrode embodiment of FIG. 2.
Figure 4:
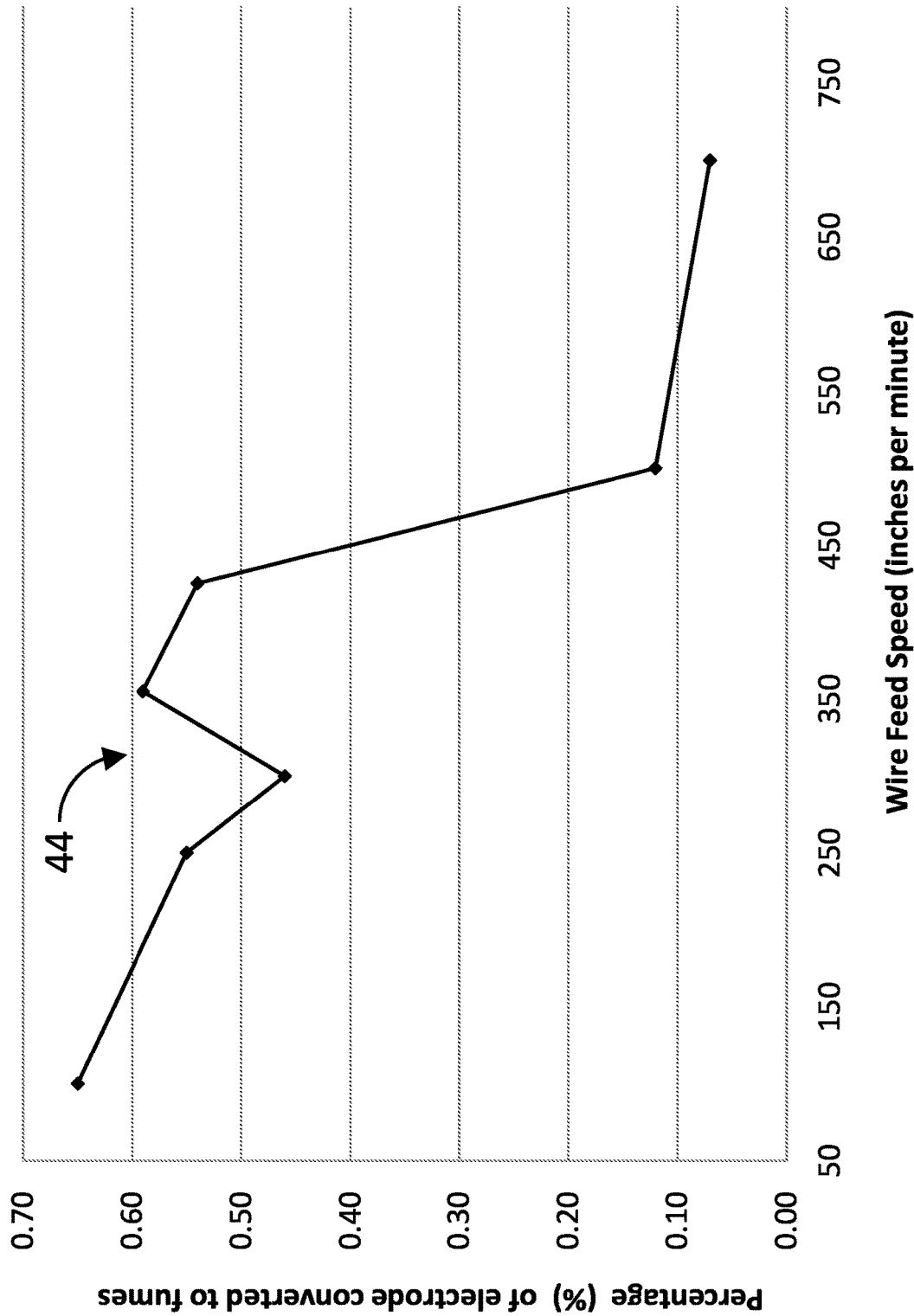
FIG. 4 is a graph illustrating percentage of the electrode converted to fumes versus wire feed speed for the series of example welding operations using the solid welding electrode embodiment of FIG. 2.
Figure 5:
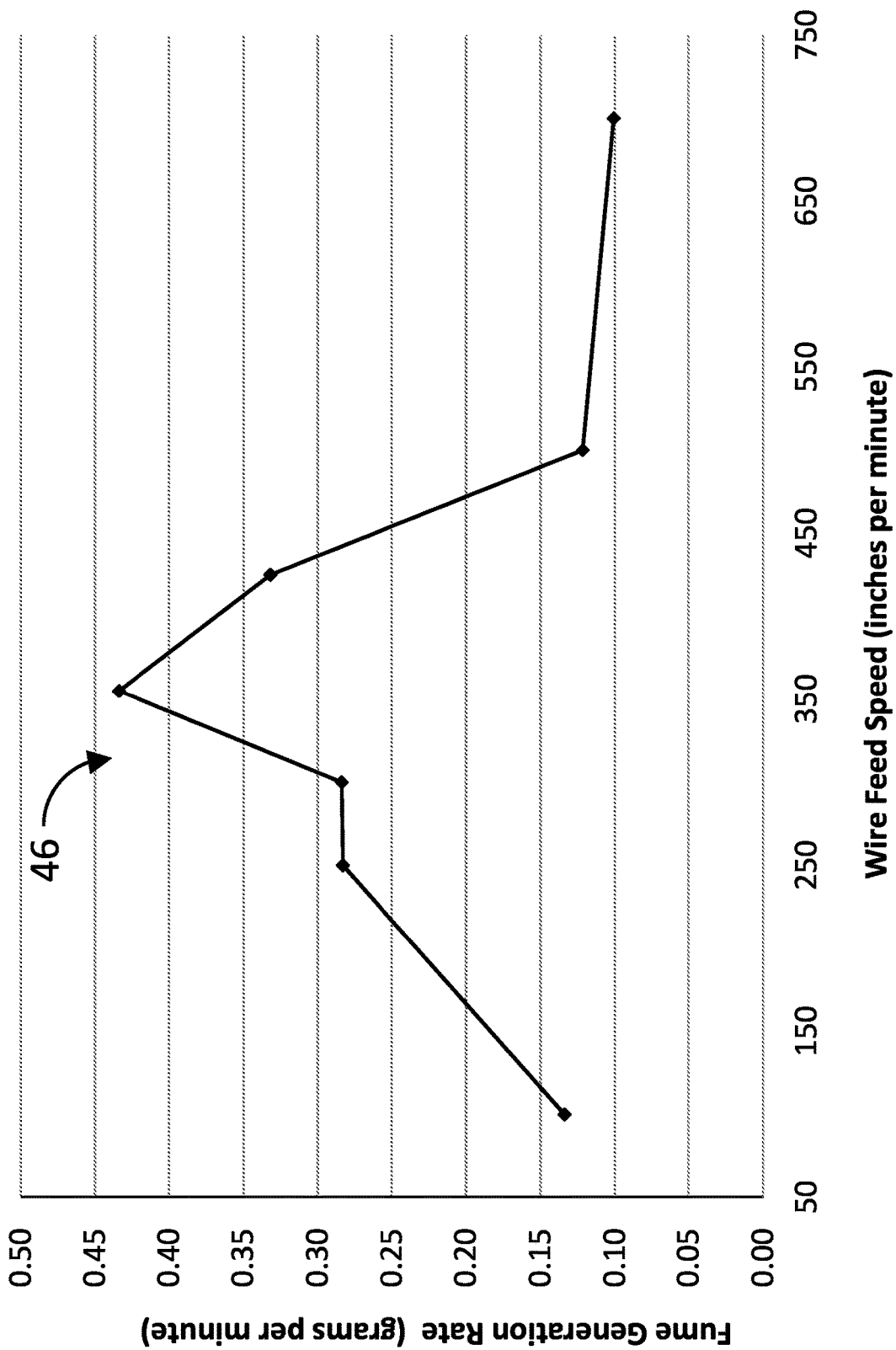
FIG. 5 is a graph illustrating welding fume generation rate versus wire feed speed for the series of example welding operations using the solid welding electrode embodiment of FIG. 2.

As illustrated by the curve 40 of FIG. 2 and the curve 42 of FIG. 3, respectively, the A3 solid welding electrode embodiment provides a nearly linear trend between the melt-off rate and the welding current and between the melt-off rate and the wire feed speed (i.e., the rate of advancement of the welding consumable toward the workpiece). As illustrated by the curve 44 of FIG. 4, the A3 solid welding electrode embodiment has a similar percentage of the welding electrode converted to fumes at wire feed speeds between approximately 250 and approximately 425 inches per minute, a slightly higher percentage of the welding electrode converted to fumes at wire feed speeds less than approximately 250 inches per minute, and substantially lower percentages of the welding electrode converted to fumes at wire feed speeds greater than approximately 425 inches per minute. As illustrated by the curve 46 of FIG. 5, the A3 solid welding electrode embodiment has a similar fume generation rate at wire feed speeds of approximately 250, approximately 300, and approximately 425 inches per minute, a highest fume generation rate at a wire feed speed of approximately 350 inches per minute, and substantially lower fume generation rate at wire feed speeds less than approximately 200 inches per minute and at wire feed speeds greater than approximately 500 inches per minute.

Figure 6:
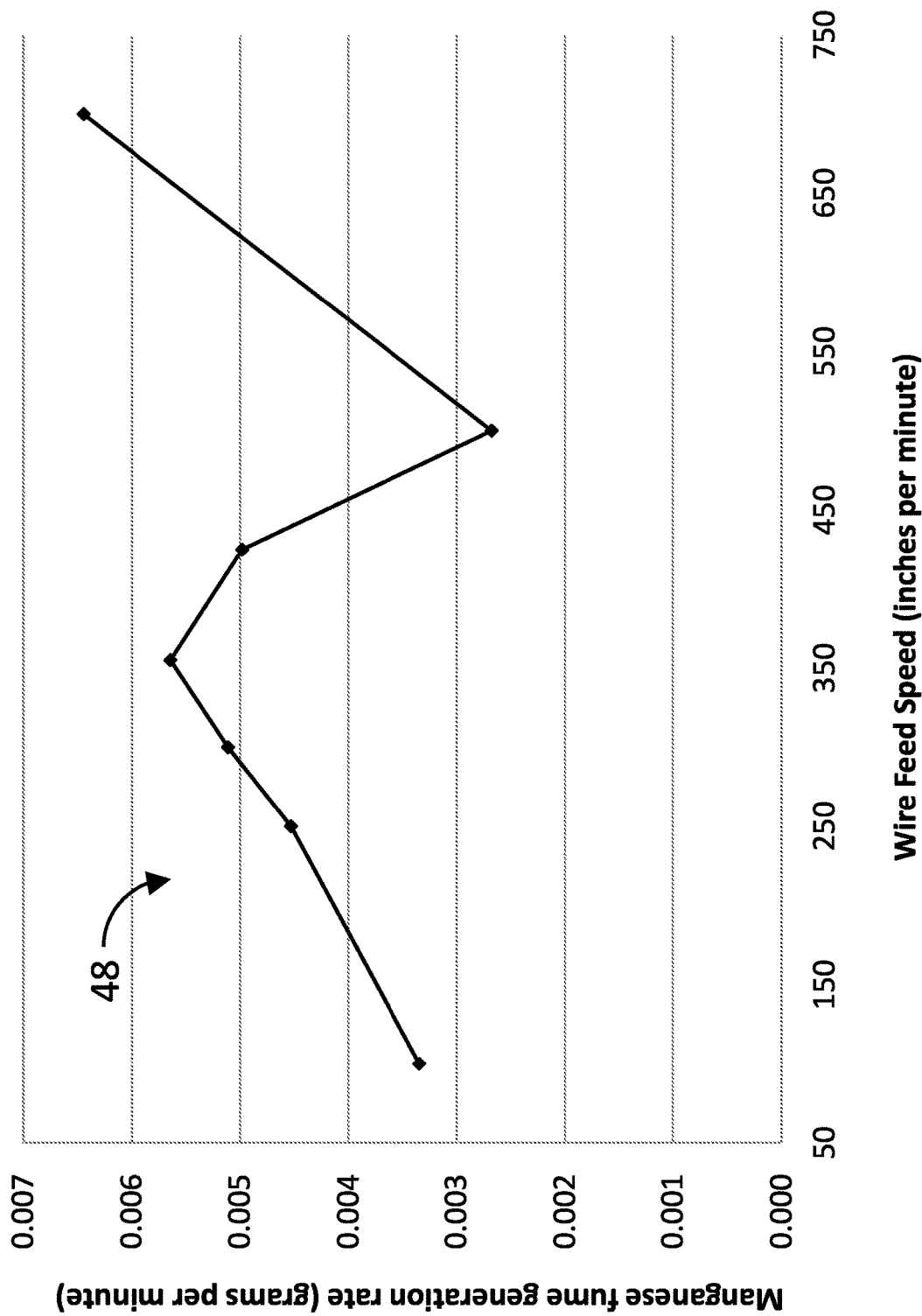
FIG. 6 is a graph illustrating manganese welding fume generation rate versus wire feed speed for the series of example welding operations using the solid welding electrode embodiment of FIG. 2.

As illustrated by the curve 48 of FIG. 6, the A3 solid welding electrode embodiment provides a low manganese fume generation rate at all wire feed speeds (e.g., between 100 and 700 inches per minute). In certain embodiments, the manganese fume generation rate provided by an embodiment of the disclosed A1 welding alloy (e.g., the A3 solid welding electrode of Table 4) may be less than approximately 0.01 grams per minute, less than approximately 0.009 grams per minute, less than approximately 0.008 grams per minute, less than approximately 0.007 grams per minute, less than approximately 0.0065 grams per minute, less than approximately 0.006 grams per minute, less than approximately 0.005 grams per minute, less than approximately 0.004 grams per minute, or less than approximately 0.003 grams per minute during an arc welding operation, depending on the parameters (e.g., wire feed speed, current, voltage, etc.) of the welding operation. In certain embodiments, the manganese fume generation rate provided by an embodiment of the disclosed A1 welding alloy (e.g., the A3 solid welding electrode of Table 4) may be between approximately 0.001 and approximately 0.01 grams per minute, between approximately 0.002 and approximately 0.007 grams per minute, or between approximately 0.0025 and approximately 0.0065 grams per minute.

While only certain features of the disclosure have been illustrated and described herein, many modifications and changes will occur to those skilled in the art. It is, therefore, to be understood that the appended claims are intended to cover all such modifications and changes as fall within the scope of the claims.

We claim:

1. An arc welding consumable that forms a weld deposit on a steel workpiece during an arc welding operation, wherein the welding consumable comprises:

between 0.4 and 2.0 wt % manganese;
strengthening agents selected from the group consisting of nickel, cobalt, copper, carbon, molybdenum, chromium, vanadium, silicon, and boron, where the strengthening agents include:
between 0.001 wt % and 1.0 wt % molybdenum; and
grain control agents selected from the group consisting of niobium, tantalum, titanium, zirconium, and boron, wherein the grain control agents comprise greater than 0.06 wt % and less than 0.6 wt % of the welding consumable, wherein the weld deposit comprises a tensile strength greater than or equal to 70 ksi, a yield strength greater than or equal to 58 ksi, a ductility, as measured by percent elongation, that is at least 22%, and a Charpy V-notch toughness greater than or equal to 20 ft-lbs at −20° F.

2. The welding consumable of claim 1, wherein the manganese fume generation rate is less than 0.01 grams per minute during the arc welding operation.

3. The welding consumable of claim 1, wherein the manganese fume generation rate is between 0.0025 grams per minute and 0.0065 grams per minute when a rate of advancement of the welding consumable toward a workpiece is less than 700 inches per minute, or when a welding current is less than 425 amps, or both, during the arc welding operation.

4. The welding consumable of claim 1, wherein the welding consumable comprises a solid welding wire, a filler rod, or a stick electrode, and wherein the arc welding operation comprises a gas metal arc welding (GMAW) operation, a submerged arc welding (SAW) operation, a shielded metal arc welding (SMAW) operation, or a gas tungsten arc welding (GTAW) operation.

5. The welding consumable of claim 1, wherein the welding consumable comprises between 0.4 wt % and 0.5 wt % manganese.

6. The welding consumable of claim 1, wherein the strengthening agents comprise copper, and wherein the welding consumable comprises between 0.001 wt % and 2 wt % copper.

7. The welding consumable of claim 1, wherein the strengthening agents comprise carbon, and wherein the welding consumable comprises between 0.001 wt % and 0.12 wt % carbon.

8. The welding consumable of claim 1, wherein the strengthening agents comprise chromium, and wherein the welding consumable comprises between 0.001 wt % and 0.8 wt % chromium.

9. The welding consumable of claim 1, wherein the grain control agents comprise titanium, and wherein the welding consumable comprises between 0.01 wt % and 0.2 wt % titanium.

10. The welding consumable of claim 1, wherein the grain control agents comprise zirconium, and wherein the welding consumable comprises between 0.01 wt % and 0.2 wt % zirconium.

11. The welding consumable of claim 1, wherein the strengthening agents and the one or more grain control agents comprise boron, and wherein the welding consumable comprises between 0.0001 wt % and 0.01 wt % boron.

12. The welding consumable of claim 1, wherein the welding consumable has a carbon equivalence (CE) of between 0.07 and 0.2 as determined according to Ito and Bessyo's method.

13. The welding consumable of claim 1, wherein the welding consumable comprises a metal sheath and a granular core.

14. The welding consumable of claim 1, wherein the welding consumable is a solid wire.

15. The welding consumable of claim 1, wherein the manganese fume generation rate is less than 0.01 grams per minute during the arc welding operation.

16. The welding consumable of claim 1, wherein the strengthening agents comprise nickel, and wherein the welding consumable comprises between 0.65 wt % and 0.85 wt % nickel.

17. The welding consumable of claim 1, wherein the strengthening agents comprise cobalt, and wherein the welding consumable comprises between 0.05 wt % and 0.7 wt % cobalt.

18. The welding consumable of claim 1, wherein the strengthening agents comprise vanadium, and wherein the welding consumable comprises between 0.001 wt % and 0.025 wt % vanadium.

19. The welding consumable of claim 1, wherein the strengthening agents include between 0.1 and 1.2 wt % silicon.

20. The welding consumable of claim 1, wherein the welding consumable comprises between 0.4 and 1.0 wt % manganese.

* * * * *